United States Patent
Pike et al.

(10) Patent No.: US 10,368,529 B2
(45) Date of Patent: Aug. 6, 2019

(54) VENTING DEVICE

(71) Applicant: Robert Dymock McIntyre, Hunterville (NZ)

(72) Inventors: Rex Allan Pike, Masterton (NZ); Robert Dymock McIntyre, Hunterville (NZ)

(73) Assignee: Robert Dymock McIntyre, Hunterville (NZ)

( * ) Notice: Subject to any disclaimer, the term of this patent is extended or adjusted under 35 U.S.C. 154(b) by 472 days.

(21) Appl. No.: 14/713,255

(22) Filed: May 15, 2015

(65) Prior Publication Data
US 2015/0327511 A1    Nov. 19, 2015

(30) Foreign Application Priority Data

May 15, 2014    (NZ) ........................................ 625021

(51) Int. Cl.
*A01K 9/00*    (2006.01)

(52) U.S. Cl.
CPC ............... *A01K 9/00* (2013.01); *A01K 9/005* (2013.01)

(58) Field of Classification Search
CPC ..... A61J 9/04; A61J 9/003; A62J 9/00; B65D 51/18; B65D 43/20
USPC ............. 119/71, 72, 75; D24/197; 29/235.5; 215/316, 200, 11.1, 11.4, 11.5, 307, 228, 215/21; 220/714, 367.1, 812, 811; 222/481.5, 482, 481, 478, 812, 811, 714, 222/367.1
See application file for complete search history.

(56) References Cited

U.S. PATENT DOCUMENTS

| | | | | | |
|---|---|---|---|---|---|
| 1,732,126 | A | * | 10/1929 | Gardner | A61J 9/04 137/543 |
| 2,321,236 | A | * | 6/1943 | Parkin | A61J 9/04 137/512.1 |
| 2,616,581 | A | * | 11/1952 | Madsen | A61J 11/008 215/11.5 |
| 2,628,616 | A | * | 2/1953 | Ransom | A61J 11/02 215/11.5 |
| 3,008,451 | A | * | 11/1961 | Curry | A01K 7/06 119/72.5 |
| 3,043,462 | A | * | 7/1962 | Brill, Jr. | A61J 9/008 215/11.1 |
| 3,292,808 | A | * | 12/1966 | Greene | A61J 9/04 137/843 |
| 3,838,784 | A | * | 10/1974 | Barton | A61J 11/0095 215/11.1 |

(Continued)

*Primary Examiner* — Andrea M Valenti
(74) *Attorney, Agent, or Firm* — Young & Thompson

(57) ABSTRACT

A venting device for an animal feeder which has a feeding teat is disclosed. The venting device has a chamber with an opening into the chamber. A vent opening is also connected to the chamber. A sealing element is retained freely moveable in the chamber. The sealing element has a first surface positioned relative to the opening such that, in use of the feeder, feed in the feeder will contact the first surface and cause the sealing element to move to a sealing position on seat to close the chamber from the vent opening. The surface is configured such that when a negative pressure in the feeder acts on the surface and is sufficient to overcome the weight of feed acting on the surface, the sealing element will be drawn into a position where the chamber can communicate with the vent opening and thereby vent the feeder to atmosphere.

10 Claims, 2 Drawing Sheets

(56) References Cited

U.S. PATENT DOCUMENTS

| | | | | |
|---|---|---|---|---|
| 4,014,365 A | * | 3/1977 | Peterson | A01K 7/06 |
| | | | | 119/75 |
| 4,700,744 A | * | 10/1987 | Rutter | F16L 37/23 |
| | | | | 137/614.04 |
| 5,079,013 A | * | 1/1992 | Belanger | A47G 19/2272 |
| | | | | 215/11.4 |
| 5,784,999 A | * | 7/1998 | Larson | A01K 9/005 |
| | | | | 119/71 |
| 5,890,620 A | * | 4/1999 | Belcastro | A47G 19/2272 |
| | | | | 215/11.4 |
| 6,523,711 B1 | * | 2/2003 | Hughes | A47G 19/2266 |
| | | | | 215/308 |
| 6,543,632 B1 | * | 4/2003 | McIntyre | A01K 9/00 |
| | | | | 119/72 |
| 6,568,557 B2 | * | 5/2003 | Fusco | A47G 19/2272 |
| | | | | 215/11.5 |
| 2013/0180457 A1 | * | 7/2013 | Pike | A61J 11/02 |
| | | | | 119/71 |
| 2014/0163463 A1 | * | 6/2014 | Agbo | A47G 19/2272 |
| | | | | 604/78 |

* cited by examiner

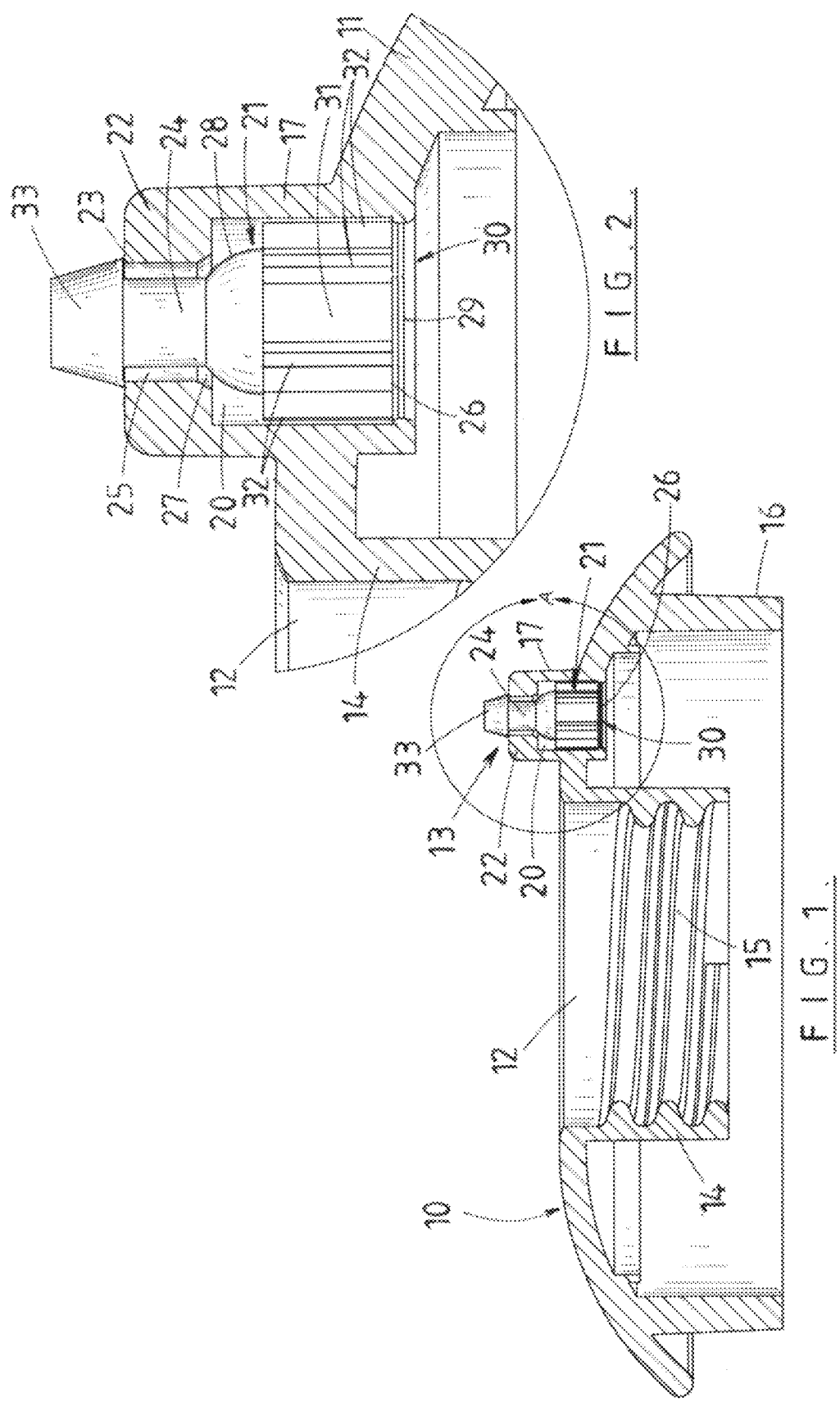

VENTING DEVICE

BACKGROUND OF THE INVENTION

This invention relates to a venting device and more particularly a venting device for a feeder which has a feeding teat. It also relates to a teat mounting closure that incorporates the venting device.

Feeders intended for the feeding of young animals such as calves, lambs, deer etc. can take the form of a bottle or container to which is mounted a feeding teat. In use the animal can suckle the teat and thereby derive a supply of liquid feed from within the bottle/container. The present invention has been primarily devised for such feeders but could also have application with other forms of teat feeders for the feeding of young animals in which a substantially closed container needs to be vented.

To ensure that the animal can derive a good flow of feed from the bottle/container it is known to provide some means of venting the interior of the bottle/container to relieve any build up of negative pressure in the bottle/container. However, venting arrangements can be unreliable in use and/or lead to undesired leakage of the liquid feed from the bottle/container during feeding of the animal. Leakage of feed can result in not only loss of valuable feed but also the creation of a mess.

Also the venting arrangement can become clogged up or not provide an effective vent to cope with the demands of an animal feeding from the bottle/container. This can especially occur when the vent includes a moving part or parts that cease to operate either fully or partially.

In this specification reference will be made to the animal feeder comprising a bottle. However, this is for convenience of description and the skilled person will appreciate that the venting device according to the invention has application to other forms of animal feeders.

SUMMARY OF THE INVENTION

An object of the invention is thus to provide a venting device for a feeder with a feeding teat, the venting device being of a simple construction yet one which is effective in providing a vent for the feeder or at least provide the public with a useful choice.

Another object of the invention is to provide a teat mounting closure for a feeder, the closure incorporating such a venting device.

Broadly in one aspect of the invention there is provided a venting device for an animal feeder which has a feeding teat the venting device including a chamber, an opening into the chamber, a vent opening which is connected to the chamber, a sealing element retained in the chamber and freely moveable therein, the sealing element has a first surface positioned relative to the opening such that in use feed in the feeder will contact the first surface and cause the sealing element to move to a sealing position where the chamber is closed from the vent opening, the said first surface being configured such that when a negative pressure in the feeder acts on the first surface and is sufficient to overcome the weight of feed acting on the first surface, the sealing element will be drawn into a venting position where the chamber can communicate with the vent opening and vent the feeder.

Broadly in a second aspect of the invention there is provided a teat mounting closure cap for a feeder bottle, the closure cap comprising a cover portion with a central opening adapted to enable a teat to be mounted to the cap, a mounting portion adapted to mount the cap to a neck of a feeder bottle, and a venting device which includes a chamber, an opening into the chamber, the position of the opening being such that the opening is, in use, exposed to an interior of the feeder bottle, a vent opening which is connected to the chamber and in use can vent the chamber to atmosphere, a sealing element retained in the chamber and freely moveable therein, the sealing element has a first surface positioned relative to the opening such that in use feed in the feeder bottle will contact the first surface and cause the sealing element into a sealing position where the sealing element closes off communication between the chamber and the vent opening, the said first surface being configured such that when a negative pressure in the feeder bottle acts on the first surface and is sufficient to overcome the weight of feed acting on the first surface, the sealing element will be drawn into a venting position where the chamber can communicate with the vent opening and vent the feeder bottle.

In a preferred embodiment a seat is located adjacent the vent opening and the sealing element has a second surface which seals on the seat when the sealing element is in the sealing position. Preferably the second surface is a curved surface.

In a preferred form of the invention the area of sealing contact between the second surface and the seat is less than the area of the first surface.

In a preferred embodiment the sealing element has a plurality of fins that slidingly locate the sealing element within the chamber. Preferably the fins extend substantially radially from the body of the sealing element. The plurality of fins can slidingly engage with an inner surface of the chamber.

In a preferred embodiment the sealing element includes a spigot that projects from the chamber into the vent opening and a clearance exists between the spigot and the vent opening via which the chamber can vent.

BRIEF DESCRIPTION OF THE DRAWINGS

In the following more detailed description of an embodiment of a venting device according the present invention reference will be made to the accompanying drawings showing a teat mounting closure cap, in the form of a bottle cap, that incorporates the venting device and in which: —

FIG. 1 is a cross sectioned view of a bottle cap which incorporates the venting device of the present invention together with a mounting for a screw on feeding teat, FIG. 2 is section "A" of the bottle cap as shown in FIG. 1 but on an enlarged scale to better illustrate the venting device and FIG. 3 is a top plan view of the bottle cap shown in FIG. 1 and indicates section line B-B on which the section of FIG. 1 is taken.

DESCRIPTION OF PREFERRED EMBODIMENTS OF THE INVENTION

Figure 3:
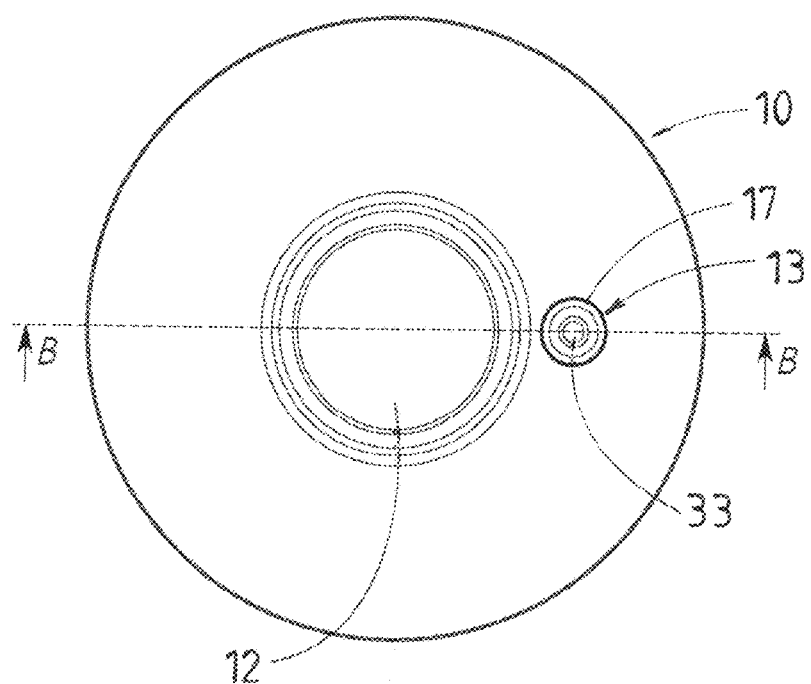

In the drawings there is shown one embodiment of a venting device incorporating the invention when forming part of a teat mounting closure in the form of a bottle cap, which for convenience will herein be simply referred to as a "cap". It will be appreciated by the skilled addressee that a venting device incorporating the invention can be achieved by way of embodiments which differ from that which is described and illustrated in the present specification. Also the venting device is shown in conjunction with a cap but this is only an illustrative example of the type of closure with which the venting device can be used.

The cap 10 as illustrated in the drawings when viewed in plan is generally circular in shape and includes a cover portion 11 with a central opening 12. The venting device 13 is combined with the cover 11 and is in the preferred form located adjacent the central opening 12. As will be apparent from the following disclosure the venting device 13 is positioned so that during feeding the feed in the bottle comes into contact with the sealing element 21 in the venting device 13.

Scalloped portions (not shown) are preferably provided at the peripheral edge of the cover 11 and form hand-gripping areas to facilitate gripping of the cap 10 when screwing the cap 10 onto or off a feeder bottle (not shown). The skilled person will appreciate that other forms of gripping portions/surfaces can be employed.

In the following description the term "top" and "outer surface" in relation to the cap 10 indicate the part of the cover 11 of the cap that is visible when the cap 10 is mounted on a feeding bottle. The terms "underside" and "interior" or "inside" of the cap 10 indicate the part of the cap 10 that is in communication with the interior of the bottle when the cap 10 is mounted on the bottle.

In the illustrated form of the cap 10 the opening 12 is intended for the mounting of a feeding teat. In a preferred form of the cap 10 the opening 12 includes a skirt 14 that has a screw form 15 formed therein. This enables a screw-threaded teat of the type sold under the trade mark PEACH and described and claimed in U.S. Pat. No. 6,374,773 to be screwed onto the cap 10. This is achieved by the screw threaded mounting portion of the teat being screwed into the threaded skirt 14 so that the teat projects from the outer surface of the cover portion of the cap 10.

It will be appreciated by the skilled person that a screw-threaded skirt 14 is not the only way in which a teat can be connected/mounted to the cap 10. For example the opening 12 will take a different form when the teat to be attached to the cap is of the known pull through type.

The cover 11 has an annular mounting skirt or wall 16. This wall 16 is positioned inwardly of the peripheral edge 11a of the cover 11 and is concentric with opening 12 and skirt 14.

The wall 16 can have a screw thread (not shown) formed therewith so that the cap 10 can be screwed onto the threaded neck of a bottle. Once again the skilled person will appreciate that the wall 16 can take different forms e.g. to allow the cap 10 to be snap fitted or interference fitted to the neck of a bottle.

In the preferred form of the cap 10 the cap is moulded in one piece from a suitable plastics material. A suitable material is polypropylene but the skilled person will understand that other plastics material suitable for the end purpose can be used.

As will be described below the housing 17 of the venting device 13 is moulded as part of the cover 11. However, the housing 17 could be made as a separate element that is fixed to the cover 11 in a post moulding operation.

The venting device 13 includes a housing 17 as mentioned above. The housing 17 defines a chamber 20 which in the preferred embodiment is substantially circular in cross section. Inside the chamber 17 is slidingly located and retained a sealing element 21 that is slidable between extremes of sealing and venting as will be hereinafter apparent.

The housing 17 projects, in the preferred form, from the outer surface of the cover 11. In the end wall 22 of the projecting portion is a vent opening or bore 23. Located within this bore 23 is a spigot portion 24 of the sealing element 21. The axis of the spigot 24 is substantially coaxial with the longitudinal axis of symmetry of the body 31 of the sealing element 21. A clearance 25 is provided between the surface of the bore 23 and the surface of the spigot 24.

The corner 27 formed by the innermost end of the bore 23 and the inner surface of the end wall 22 forms a seat with which a sealing surface 28 of the sealing element 21 can sealingly engage. In one form the corner 27 can be a right angle but in the preferred form shown in FIG. 2 it can be profiled to provide engagement over a greater interface with the sealing surface 28. A profiled seat 27 that follows the contour of sealing surface 28 is thus shown in FIGS. 1 and 2.

The other or inner end of the chamber 20 is open but in the preferred form it has a peripheral rim 29 which defines opening 30. The rim 29 is profiled as shown to enable the sealing element 21 to be forced through the opening 30 when the sealing element 21 is installed in the chamber 20 in a post moulding assembly and thereby be moveably retained in the chamber 20.

The body 31 of the sealing element 21 has a plurality of outwardly projecting flutes or fins 32 (hereinafter "fins") which slidingly locate the sealing element 21 in the chamber 20 and preferably engage with the inner wall surface of the chamber 20. These fins 32 (which preferably project radially from the body 31) are as thin as possible so as to keep sliding contact surface to a minimum. Also the thinness of the fins 32 enable them to fold over slightly when the sealing element 21 is forced through opening 30.

The rim 29 thus retains the sealing element 21 in the chamber 20 because the diameter of the opening 30 is less than the diameter of an imaginary circle that extents about the extremities of the fins 32. Other means for retaining the sealing element 21 in the chamber 20 yet permit the sealing element 21 to be installed in the chamber 20 could be used.

In the preferred form of the invention the sealing surface 28 is a curved surface as shown in the drawings. As a result of the configuration of the seat 27 and the sealing surface 28 being profiled the contact surface between the sealing surface 28 and the seat 27 is as small as possible while still achieving the sealing functionality.

It will be appreciated that other forms of seat and seal can be used within the general requirement of achieving sealing functionality but with the seal element being able to be readily drawn off the seat under the action of a negative pressure build up in the bottle.

The sealing element 21 is made of any suitable material though preferably it is a plastics material such as polypropylene or nylon.

In use of the cap 10 a teat will be attached to the cap by the mounting end of the teat being screwed into the opening 12.

The teat could also be mounted in a pull through fashion (as could other pull through type teats). Such a teat will generally have a flange and spaced therefrom a shoulder. For pull through mounting the skirt 14 will not be present thus a simple opening will be formed in the cover 11. In a conventional manner the outlet end of the teat will be pulled through the opening 12 from the inside of the cap until the periphery of the opening 12 and the area of the cover 11 surrounding the opening 12 is located between the flange and the shoulder of the teat.

The interior of the bottle to which the cap 10 is fitted can thus breathe through the venting device 13.

When the bottle is inverted (so the teat is downwardly directed at an angle for an animal to suckle) a liquid feed in the bottle will flow through the opening 30 and into contact with the end surface 26 of the sealing element 21. Due to the relative position of the opening 30 to surface 26 of the sealing element 21 this weight of feed in contact with the sealing element 21 during a normal feeding operation causes the sealing element 21 to move in the chamber 20 so that the sealing surface 28 seats and seals on seat 27. Communication between the vent opening 23 and the chamber 20 is closed off. The weight of the feed retains the sealing element 21 on the seat 27.

Due to the animal sucking on the teat a negative pressure will build up in the bottle. The surface area of the end surface 26 of the sealing element 21 is greater than the sealing surface created by the interface between seat 27 and sealing surface 28. Thus when the negative pressure build up in the bottle caused by the animal drinking is sufficient to overcome the weight of feed acting on surface 26 the sealing element 21 will move in the chamber 20 such that sealing surface 28 is drawn off the seat 27.

The bottle will therefore momentarily vent to atmosphere through the clearance 25 between the spigot 24 and bore 23 and into the bottle past the body 31 of the sealing element 21 and via opening 30. However, as soon as the venting has occurred the sealing element 21 will move (under the weight of the feed) back to the sealed position, i.e. surface 28 will seal back on seat 27.

The venting device 13 thus operates by effectively using the weight of the liquid feed in the bottle as a biasing effect on the sealing element 21 so that it moves into the sealing position.

Thus as the animal suckles the teat the sealing element 21 will tend to oscillate between sealed and venting positions in response to negative pressure build up in the bottle as the animal sucks and releases the teat. As a consequence good venting of the bottle occurs. Because the oscillating movement of the sealing element 21 will be relatively rapid little if any leakage of feed through the venting device 13 occurs.

If after say a period of non-use the seal element 21 jambs or sticks in the chamber 20 due to dried or partially dried feed in the venting device 13 (especially if the bottle/cap has not been cleaned or fully cleaned) a slight pressure applied to the exposed/projecting end 33 of the spigot 24 will break any connection between the flutes/fins 32 and the chamber wall and/or the seat 27 and surface 28 and thereby allow the seal element 21 to slide in the chamber. The small surface contact between the fins 32 and the wall of chamber 20 and the seat 27 and the surface 28 will, however, lessen the possibility of the sealing element 21 sticking.

Also it is believed that in normal use the continual movement phases of the sealing element 21 in the chamber 20 and venting air passing through the clearance 25 and the chamber 20 will result in the venting device being largely self cleaning.

Because the venting device does not rely on any mechanical biasing element(s) such as a spring the venting device is less likely to stick and become inoperative or less effective in operation.

The venting device is of simple construction and operation. The lightweight nature of the sealing element 21 and the low friction contact between the sealing element 21 and the wall of the chamber 20 results in the venting device being quick and responsive in operation.

The venting device 13 operates automatically when the feeding bottle is used.

The venting device according to the present invention thus provides a simple yet very effective venting means and has particular application for an animal-feeding teat mounted by a cap to a feeder such as a bottle.

The invention is open to modification as will be appreciated by the skilled person. For example the venting device 10 does not need to be part of a removable cap as described. The opening/teat mounting might thus be an integral part of a feeder rather than a removable part. It is envisaged, for example, that one or more of the venting devices 13 could be suitably positioned in the manifold of a manifold feeder which may be advantageous to relieve any negative pressure build up in the manifold.

The present invention has been described and illustrated by way of a specific embodiment. It is not the intention of the Applicant to restrict or in any way limit the scope of the invention to such an embodiment. Modifications and changes within the inventive concept will be apparent to the skilled person.

Therefore, the invention in its broader aspects is not limited to the specific details, representative means of manufacture and method, and illustrative examples shown and described in this specification. Accordingly departures may be made from such details without departing from the spirit or scope of the Applicant's general inventive concept.

What is claimed is:

1. A teat mounting closure cap for a feeder bottle, the closure cap comprising:
   a cover portion with a central opening adapted to enable a teat to be mounted to the closure cap;
   a mounting portion adapted to mount the closure cap to a neck of a feeder bottle; and
   a venting device, the venting device including
      a chamber,
      an opening into the chamber positioned such that when the closure cap is mounted to a feeder bottle the opening is exposed to an interior of the feeder bottle,
      a vent opening which is connected to the chamber and, in use, vents the chamber to atmosphere, and
      a sealing element retained in the chamber and freely slidable therein, the sealing element having a plurality of fins that slidingly locate the sealing element within the chamber,
   the sealing element also having a first surface positioned relative to the opening such that, in use, feed in the feeder bottle will contact the first surface and cause the sealing element to move into a sealing position where the sealing element closes off communication between the chamber and the vent opening, and
   the first surface being configured such that when a negative pressure in the feeder bottle acts on the first surface and is sufficient to overcome the weight of feed acting on the first surface, the sealing element is drawn into a venting position wherein the chamber is in communication with the vent opening so as to vent the feeder bottle.

2. The closure cap as claimed in claim 1, wherein a seat is located adjacent the vent opening and the sealing element has a second surface which seals on the seat when the sealing element is in the sealing position.

3. The closure cap as claimed in claim 2, wherein the second surface is a curved surface.

4. The closure cap as claimed in claim 3, wherein the area of sealing contact between the second surface and the seat is less than the area of the first surface.

5. The closure cap as claimed in claim 1, wherein the plurality of fins slidingly engage with an inner surface of the chamber.

6. The closure cap as claimed in claim 5, wherein the fins extend substantially radially from the body of the sealing element.

7. The closure cap as claimed in claim 5, wherein said plurality of fins each being spaced from one another, and each one of the plurality of fins extends radially from an outer surface of the sealing element toward the inner surface of the chamber so that tips at ends of said fins slidingly engage with the inner surface of the chamber.

8. The closure cap as claimed in claim 5, wherein said inner surface of the chamber completely surrounds an outer surface of the sealing element, said inner surface of the chamber and said outer surface of the sealing element facing each other, and each of said plurality of fins being spaced from one another and extending outward from the outer surface of the sealing element toward the inner surface of the chamber.

9. The closure cap as claimed in claim 1, wherein the sealing element includes a spigot that projects from the chamber into and through the vent opening.

10. The closure cap as claimed in claim 9, wherein there is a clearance between the spigot and the vent opening.

* * * * *